FIG. I

INVENTOR.
HOWARD C. ZACHMANN
BY
Robert L. Berger
ATTORNEY

INVENTOR.
HOWARD C. ZACHMANN

United States Patent Office 3,336,162
Patented Aug. 15, 1967

3,336,162
FUEL CELL AND ELECTRICAL GENERATOR SYSTEM
Howard C. Zachmann, Baltimore, Md., assignor to Martin-Marietta Corporation, New York, N.Y., a corporation of Maryland
Filed July 3, 1963, Ser. No. 292,532
5 Claims. (Cl. 136—86)

This invention relates to an integrated environmental control and power supply system and more particularly to a means and process whereby the fluid employed to drive an engine first serves as a low temperature heat sink and is subsequently employed in a fuel cell to generate electrical power.

At the present time both Government and industry are diligently striving to develop a vehicle capable of extended operation on the lunar surface. Although many problems associated with such an undertaking remain unsolved, this invention constitutes an important contribution toward this goal by providing an excellent power supply and thermal control system for such a vehicle.

A lunar vehicle's power supply and thermal control system must meet stringent requirements with respect to configuration, logistic support and environmental control. It is mandatory that the vehicle be provided with the capability to operate for an extended period and at any time during the lunar cycle. Also, the vehicle's thermal control system must be capable of providing a suitable environment for man during the 250° F. lunar day and the −250° F. lunar night. In addition, the power supply and thermal control system must be of minimum weight and occupy a minimum of space. Most importantly, the system employed must utilize a fuel which does not present an impossible logistic problem.

The unusual conditions imposed on a vehicle intended for lunar operations clearly indicate that heretofore devised power supplies are impractical for such an application. For example the use of power supplies utilizing conventional fuels, such as gasoline or oil, is immediately eliminated due to the logistic problem associated with the supply of such fuels and necessary oxidizers. For all practical purposes the large and heavy radiators associated with solar power supplies eliminate further consideration of their use in such an application. Nuclear power supplies would require protective shielding of such substantial weight as to make their use impractical. Conventional types of fuel cells present impossible logistic fuel supply and heat rejection problems and the same is true of rotating power supplies utilizing hydrogen or hypergolic fuels. Electro-chemical batteries are undesirably heavy and would require the use of standby units.

None of the above limitations of the prior art systems are associated with the system provided herein. In addition, while this system is ideally suited for lunar vehicle use, its advantages may also be realized in various terrestrial applications.

It is therefore a primary object of the present invention to provide an integrated environmental control and power supply system and process ideally suited for use on a lunar vehicle. An integrated system is herein provided for furnishing electrical power and thermal control for a lunar vehicle which is relatively light in weight and occupies a minimum of space. This invention also provides a system and process for regenerating the fuel employed in a lunar vehicle's supply system. Another object of this invention is to provide an efficient power supply and environmental control system and process for terrestrial applications.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings in which:

Briefly, this invention comprises cascading a hydrogen expansion turbine with a hydrogen fuel cell such that the exhaust from the turbine is introduced into the fuel cell. The hydrogen acts as a low temperature heat sink, drives the turbine to produce electrical and/or mechanical power and then reacts with another substance, such as lithium, in the fuel cell to produce an electrical energy output. The typical system for lunar vehicle application employs hydrogen-lithium fuel cells and means are provided to utilize the waste heat from a nuclear reactor to regenerate both hydrogen and lithium from the lithium hydride product of the fuel cell reaction. In addition, the heat of the fuel cell reaction is employed when desirable to increase the energy of the hydrogen prior to its being expanded in the turbine, to prevent an overcooling condition within the system and/or to heat the vehicle cabin.

Figure 1:
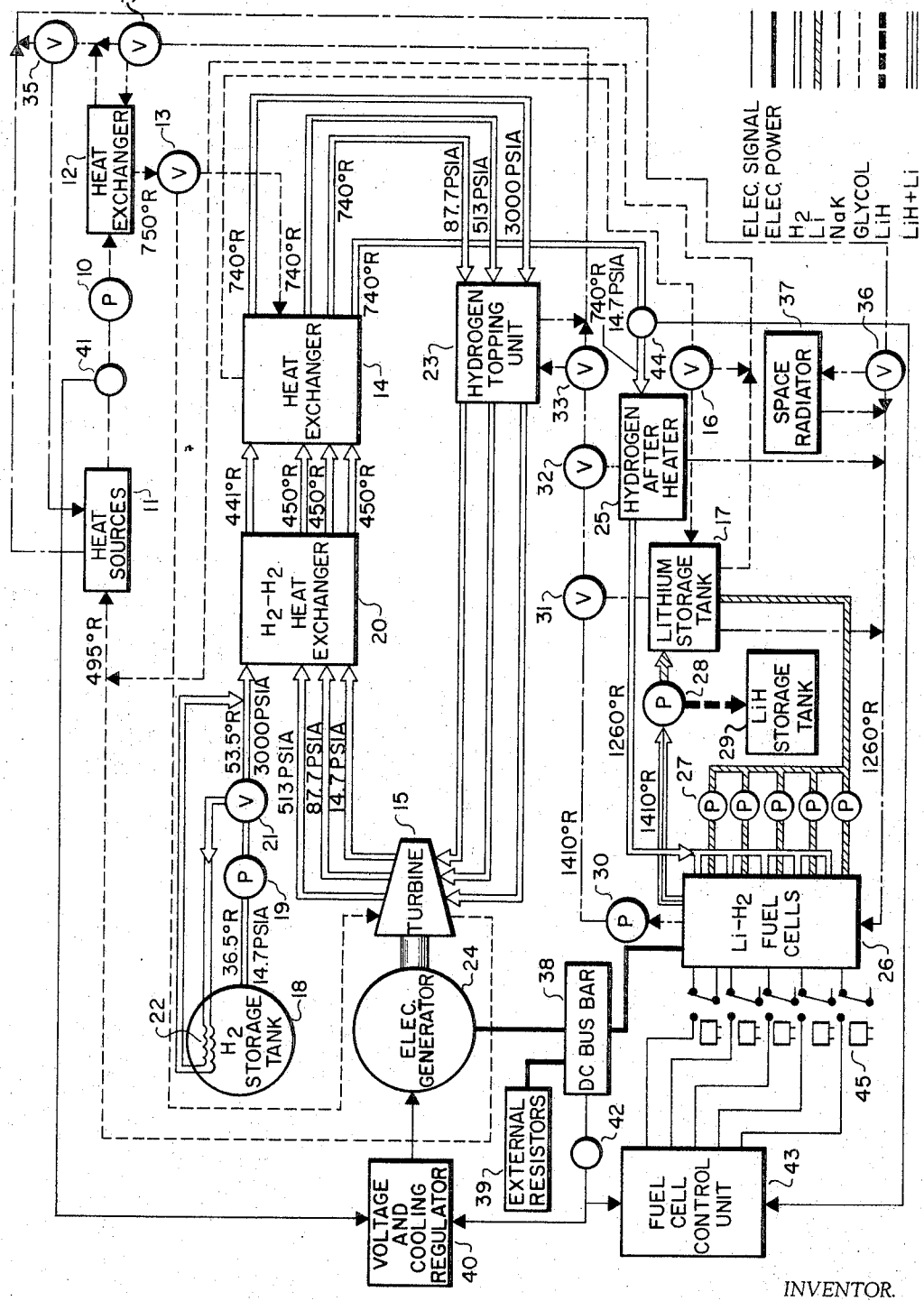
FIGURE 1 is a schematic diagram of a preferred embodiment of this invention for use in a lunar vehicle.

Referring now to FIGURE 1 in detail, there is shown a schematic diagram of a preferred embodiment of this invention particularly well adapted for use on a lunar vehicle. As presented therein, a pump 10 causes a suitable coolant, such as glycol, to be circulated through various heat sources 11 of the lunar vehicle. For example, these heat sources 11 would typically comprise the vehicle's propulsion unit (electrical motors), the electrical generator, various other electrical equipments carried by the vehicle, metabolic sources and the heat within the cabin from the lunar environment. The manner by which the coolant is circulated through the various heat sources 11 to effect a heat transfer therebetween does not constitute part of the present invention and, consequently, has not been described herein. After passing through the pump 10, the coolant flows through a first heat exchanger 12 and then through a proportional control valve 13, which proportions the coolant from the heat source 11 between a second heat exchanger 14 and a hydrogen expansion turbine 15, dependent upon the amount of hydrogen flowing through the turbine 15, for purposes to be explained in considerable detail hereinafter. The coolant from the turbine 15 returns directly to the heat sources 11 while a solenoid valve 16, which is energized or deenergized in response to the temperature of lithium stored in a lithium storage tank 17, causes the coolant from the heat exchanger 14 to either be directly returned to the heat sources 11 or to flow through the lithium storage tank prior to its being returned to the heat sources 11.

Liquid hydrogen is initially stored under low temperature low pressure conditions in a suitable storage tank 18. A high pressure cryogenic pump 19 causes hydrogen from the storage tank 18 to flow through a hydrogen-to-hydrogen heat exchanger 20 before being delivered to the heat exchanger 14 in a low temperature high pressure condition. A proportional control valve 21 is located in the hydrogen line between the pump 19 and the hydrogen-to-hydrogen heat exchanger 20 to divert a portion of the hydrogen from the pump through a heating coil 22 in the tank 18 so as to maintain the desired pressure on the hydrogen contained therein. In the heat exchanger 14 heat is transferred from the coolant to the hydrogen such that the hydrogen leaves the heat exchanger 14 in a high temperature high pressure state. After making its initial pass through the hydrogen-to-hydrogen heat exchanger 20 and the heat exchanger 14, the hydrogen makes several passes through a hydrogen topping unit 23 (the operation of which will be subsequently explained), the turbine 15 (wherein it is expanded in several stages to drive an electrical generator 24), the hydrogen-to-hydrogen heat exchanger 20 and the heat exchanger 14.

After its final pass through the heat exchanger 14, the hydrogen flows through a hydrogen after-heater 25, whose function will be later described, and is delivered in a high temperature low pressure condition to a plurality of lithium-hydrogen fuel cells 26. Associated with each of the lithium-hydrogen fuel cells 26 is a positive displacement feed pump 27 which delivers lithium from the lithium storage tank 17 to its respective fuel cell. A centrifugal separation pump 28 is employed to remove the slurry of the lithium hydride product of the chemical reaction within the fuel cells 26 plus any unreacted lithium from the fuel cells and to deliver these two components, i.e. lithium hydride and lithium, to a lithium hydride storage tank 29 and the lithium storage tank 17, respectively.

A relatively large amount of heat is generated by the chemical reaction within the fuel cells 26 and a high temperature pump 30 is employed to circulate a suitable coolant, such as a eutectic mixture of sodium and potassium, through the fuel cells.

A proportional control valve 31, which operates in response to the temperature of the lithium within the lithium storage tank 17, directs a sufficient amount of the coolant from the fuel cells 26 through the lithium storage tank to liquefy the lithium therein and to raise it to the proper temperature (normally approximately 1260° R.) for its introduction into the fuel cells. Similarly, a proportional control valve 32, which operates in response to the temperature of the hydrogen immediately before its introduction into the fuel cells 26, directs a sufficient amount of the coolant from the fuel cells through the hydrogen after-heater 25 to raise the temperature of the hydrogen to a suitable level (normally approximately 1260° R.) for use in the fuel cells. As will be later explained in more detail, a proportional control valve 33 operates in response to the power output of the system to direct a portion of the coolant from the fuel cells through the hydrogen topping unit 23. That portion of the coolant from the fuel cells 26 which is not directed through the lithium storage tank 17 and the hydrogen after-heater 25 flows through a proportional control valve 34, which is responsive to the temperature of the coolant leaving the heat sources 11, to cause a portion of the coolant from the fuel cells to flow through the heat exchanger 12 before being returned to the fuel cells. After flowing through the valve 34 and at certain times the heat exchanger 12, the coolant from the fuel cells 26 enters another proportional control valve 35 which, as will be subsequently discussed in detail, under certain operating conditions causes a portion thereof to flow through the heat sources 11. Interposed in the coolant line between the valve 35 and the fuel cells 26 is still another proportional control valve 36 which is responsive to the temperature of the coolant immediately prior to its entering the fuel cells to cause a portion of the coolant to flow through a space radiator 37, under certain operating conditions also to be later explained, before being returned to the fuel cells.

The electrical power outputs of the electrical generator 24 and the fuel cells 26 are coupled to a DC bus bar 38 with which is associated a group of external resistors 39, the operation of which will be later described. A voltage and cooling regulator 40 which is responsive to the temperature of the coolant leaving the heat sources 11 as indicated by a temperature sensitive element 41 and the system's power output as indicated by an electrical power sensitive element 42 in a manner to be described, is connected to the electrical generator 24. As will also be later explained a fuel cell control unit 43 operates in response to a voltage input from the DC bus bar 38 and the pressure of the hydrogen entering the fuel cells 26 as indicated by a pressure sensitive element 44 to energize individual ones of the plurality of fuel cells 26 and their associated pumps 27 through a plurality of relays 45.

In order to impart a better understanding of the present invention certain operating temperatures and pressures have been reflected in the schematic diagram of FIGURE 1. Since different applications of this invention will naturally require different design operating conditions, it is to be understood that these characteristics are exemplary only and are not to be construed as a limitation of the present invention.

In operation, the hydrogen from the storage tank 18 acts as a low temperature heat sink in the heat exchanger 14 for the coolant from the heat sources 11, as the working fluid for the hydrogen expansion turbine 15 and finally as one of the fuels for the lithium-hydrogen fuel cells 26. The power output of the turbine 15 may be utilized to produce electrical energy by being coupled to the electrical generator 24 as shown, or to produce mechanical energy, or to produce a combination of electrical and mechanical energy. In order to improve the operating efficiency of the system, the hydrogen from the storage tank 18 is caused to make a plurality of passes between the heat exchanger 14 and the turbine 15 wherein it is heated and expanded, respectively, prior to its being delivered to the lithium-hydrogen fuel cells 26. The low temperature hydrogen from the storage tank 18 is heated in the hydrogen-to-hydrogen heat exchanger 20 before its initial introduction into the heat exchanger 14 so that the coolant from the heat sources 11 will not become frozen within the heat exchanger 14. After maximum utilization of the energy of the hydrogen to drive the turbine 15, it is exhausted at a relatively low pressure to the fuel cells 26.

The valve 13 continually proportions the coolant from the heat sources 11 between the turbine 15 and the heat exchanger 14 such that a sufficient amount of heat is transferred therefrom to the hydrogen as it drives the turbine 15 to effect substantially a polytropic expansion of the hydrogen within the turbine. This is accomplished by a flowmeter (not shown) which senses the amount of hydrogen flowing through the system to control the operation of the valve 13. After passing through the turbine 15, the coolant is returned to the heat sources 11. That portion of the coolant from the heat sources 11 which flows through the heat exchanger 14 is cooled therein while adding energy to the hydrogen flowing therethrough. The operation of the valve 16 is continuously controlled by the temperature of the lithium in the storage tank 17 and the temperature of the coolant leaving the heat exchanger 14 in a manner whereby the coolant is employed to raise the temperature of the lithium in storage tank whenever the temperature of the coolant is higher than the temperature of the lithium.

Valves 31 and 32 continuously function to direct the proper amounts of the coolant from the fuel cells 26 through the lithium storage tank 17 and the hydrogen after-heater 25 such that lithium and hydrogen, respectively, are introduced into the fuel cells 26 at the proper temperatures. As previously indicated, a plurality of positive displacement pumps 27 deliver lithium from the lithium storage tank 17 to respectively fuel cells 26 wherein the lithium and hydrogen initiate a chemical reaction to produce electrical energy which is coupled to the output of the electrical generator 24 on the DC bus bar 38. The valve 36 continually proportions the proper amount of the coolant from the lithium-hydrogen fuel cells 26 through the space radiator 37, where heat is rejected if necessary to the environment in which the vehicle is operating, such that the coolant is returned to the fuel cells at the proper temperature.

The system is designed so that when there is a relative balance between the cooling load and power load on the system, the valves 33 and 34 are closed thereby preventing coolant from the lithium-hydrogen fuel cells 26 from flowing through the hydrogen topping unit 23 and the heat exchanger 12, respectively. In addition, under such operating conditions, the external resistors 39 are disconnected from the DC bus bar 38 and the valve 35 is closed preventing coolant from the fuel cells 26 from flowing through the heat sources 11.

As the cooling load on the system increases from a balanced load condition, a temperature rise is initially sensed in the coolant leaving the heat sources 11. In response to this temperature rise, the voltage and cooling regulator 40 effects a load increase on the electrical generator 24 by changing the field current thereof thereby causing an increase in the hydrogen flow through the system to handle the greater cooling load thereon. Since the electrical power output of the system is increased as the greater amount of hydrogen flows therethrough, external resistors 39 are coupled to the DC bus bar 38 as necessary to effect a balance between the electrical load on the system and its electrical power output.

As the cooling load on the system decreases from a balanced load condition, a temperature decrease is initially sensed in the coolant leaving the heat sources 11. In response to this temperature drop, the voltage and cooling regulator 40 decreases the load on the electrical generator 24 to decrease the hydrogen flow through the system to that amount necessary to accommodate the decreased cooling load. The decreased hydrogen flow results in a corresponding decrease in the system's power output which power decrease activates the valve 33 such that a sufficient amount of heat is transferred from the coolant from the lithium-hydrogen fuel cells 26 to the hydrogen as it flows through the hydrogen topping unit 23 to effect a balance between the system's power output and the power load thereon. In the event that the power load on the system still exceeds the system power output when all of the coolant from the lithium-hydrogen fuel cells 26 is flowing through the hydrogen topping unit 23, the voltage and cooling regulator 40 increases the load on the electrical generator 24 to increase the hydrogen flow to a point where there is a balance between the system's power output and the power load thereon. In such cases the coolant passing through the heat exchanger 14 will initially be overcooled and, in response to a corresponding temperature drop in the coolant as it leaves the heat sources 11, the valve 34 directs coolant from the fuel cells 26 through the heat exchanger 12 as required to raise the temperature of the coolant entering the heat exchanger 14 the necessary amount.

As the power load on the system increases from a balanced load condition the valve 33 is energized to direct coolant from the lithium-hydrogen fuel cells 26 through the hydrogen topping unit 23 in sufficient quantity to increase the power output of the electrical generator 24 so that the total power output of the system is capable of handling the increased load thereon. In the event that the use of the hydrogen topping unit 23 does not increase the system's power output sufficiently to satisfy the increased power load, the voltage and cooling regulator 40 increases the load on the electrical generator 24 to increase the hydrogen flow through the system the amount necessary to produce the required system power output. Since an overcooling condition will now exist, the valve 34 accommodates therefor by directing a sufficient amount of coolant from the lithium-hydrogen fuel cells 26 through the heat exchanger 12 to add the proper amount of heat to the coolant from the heat sources 11.

As the power load on the system decreases from a balanced load condition, external resistors 39 are coupled to the DC bus bar 38 as necessary to effect a balance between the electrical load on the system and the electrical power output of the system.

It should be noted that, while the heat within the cabin from the lunar environment has previously been referred to as one of the "heat sources 11," the vehicle cabin must be heated rather than cooled under certain operational conditions such as during the lunar night. This is readily effected by the waste heat from the other heat sources 11 in most such instances. However, when these other heat sources 11 are not sufficient to adequately heat the vehicle cabin at such times, the valve 35 is responsive to the temperature within the cabin to cause a sufficient quantity of the coolant from the fuel cells 26 to flow through the heat sources 11 as will maintain the proper cabin temperature.

From the foregoing descripiton of system operation it will be seen that whenever the hydrogen flow through the system is sufficient to satisfy the cooling load but insufficient to satisfy the power load, the hydrogen topping unit 23 operates to increase the power output of the system without increasing the hydrogen flow therethrough. The heat exchanger 12 is employed to transfer heat from the chemical reaction in the fuel cells 26 to the coolant from the heat sources 11 whenever the hydrogen flow necessary to satisfy the power load on the system would otherwise create an overcooling condition. The external resistors 39 are coupled to the DC bus bar 38 to match the load on the DC bus bar to the system's power output at such times as the hydrogen flow through the system necessary to handle the cooling load thereon results in a greater system power output than required to handle the power load.

Figure 2:
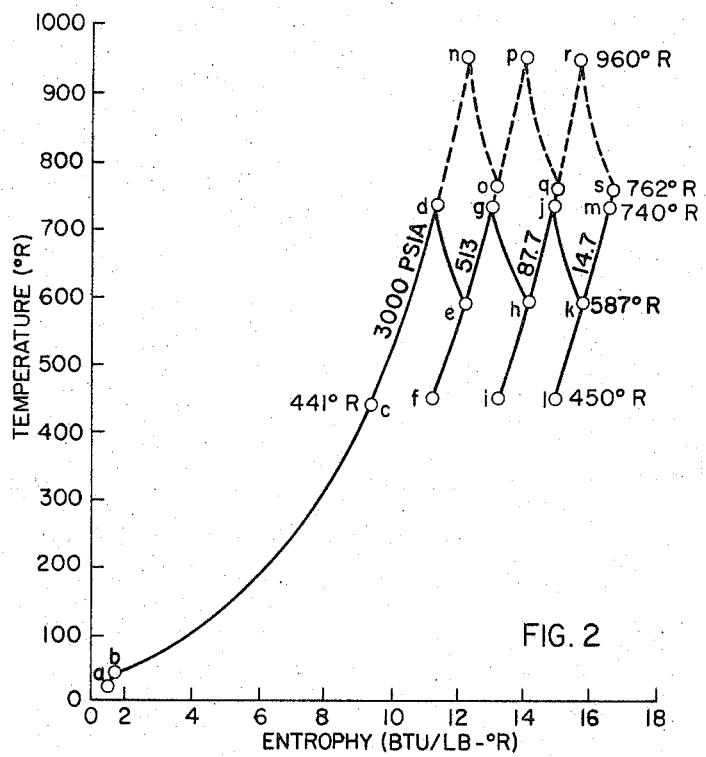
FIGURE 2 is a typical temperature-entropy diagram of the system illustrated in FIGURE 1.

FIGURE 2 is a temperature-entropy diagram of the typical system described above. Again it must be noted that this diagram is explanatory in nature and is not to be interpreted as a limitation of the invention presented herein. Point $a$ of FIGURE 2 represents the condition of the hydrogen within the storage tank 18. The pump 19 raises the hydrogen temperature and pressure as indicated at point $b$ and the entropy of the hydrogen is further increased as it intially flows through the hydrogen-to-hydrogen heat exchanger 20 to a point $c$. Additional heat is added to the hydrogen as it initially passes through the heat exchanger 14 (line $cd$) and the line $de$ represents the initial polytropic expansion stage of the hydrogen within the turbine 15. The hydrogen is cooled (line $ef$) as it makes its second pass through the hydrogen-to-hydrogen heat exchanger 20. Line $fg$ represents the addition of heat to the hydrogen as it makes its second pass through the heat exchanger 14. Subsequent passes of the hydrogen through the turbine 15, the hydrogen-to-hydrogen heat exchanger 20 and the heat exchanger 14 are indicated by lines $gh$ and $jk$, $hi$ and $kl$, $ij$ and $lm$, respectively. The effect of adding energy to the hydrogen as it flows through the hydrogen topping unit 23 is represented by the dotted lines of FIGURE 2 wherein the addition of energy to the hydrogen as it flows through the topping unit is indicated by lines $dn$, $op$, and $qr$.

The system illustrated in FIGURE 1 includes five lithium-hydrogen modular fuel cells 26 each of which has associated therewith a positive displacement pump 27. After making its final pass through the heat exchanger 14, the hydrogen flows through the hydrogen after-heater 25 and then is made available to all five fuel cells 26. On the basis of the pressure of the hydrogen as it is introduced in the fuel cells 26, i.e. the hydrogen flow rate, and the voltage on the DC bus bar 38, the fuel cell control unit 43 selects the proper number of fuel cells 26 to be connected to the DC bus bar 38 to satisfy the voltage, power load and hydrogen flow rate requirements of the system. After making the proper selection, the fuel cell control unit 43 energizes the selected fuel cells 26, and those positive displacement pumps 27 associated therewith, through relays 45. This operation may be readily understood by referring to FIGURE 3 wherein there is shown the relationships between the generator and fuel cell power output and the hydrogen flow rate and the bus voltage for a typical five module fuel cell system. It will immediately be apparent from an examination of FIGURE 3 that the regulation of bus voltage is enhanced as the number of available fuel cell modules is increased and that for a fixed hydrogen flow rate the system often may be operated on more than one number of modules. The fuel cell control unit 43 continuously selects the number of fuel cells 26 which provides the best voltage regulation of the DC bus bar 38 for the hydrogen flow rate through the system.

As previously indicated, the lithium hydride product of the chemical reaction within the fuel cells 26 is separated from unreacted lithium by the centrifgual separation pump 28 and delivered to the lithium hydride storage tank 29. At convenient points in system operation and as necessary, the hydrogen storage tank 18 may be replaced with a full tank of hydrogen and the lithium hydride removed from the lithium hydride storage tank 29.

Figure 4:
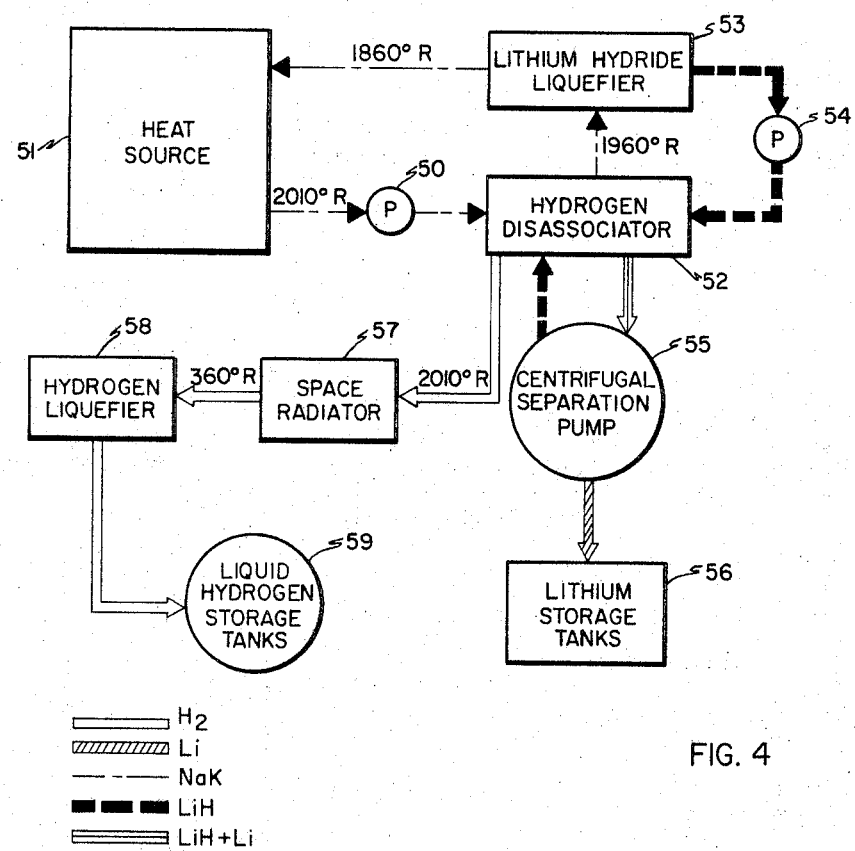
FIGURE 4 is a schematic diagram of the fuel regenerative system of the present invention.

Referring now to FIGURE 4, there is schematically shown a preferred embodiment of the fuel regeneration system of the present invention. A high temperature pump 50 causes a suitable fluid, such as a mixture of sodium and potassium, to be circulated through a heat source 51, a hydrogen disassociator 52 and a lithium hydride liquefier 53. While any heat source capable of maintaining the temperature of the circulating liquid above approximately 1550° F., for instance one consisting of a solar power supply, may be employed as the heat source 51 in this system, overall operating efficiency is enhanced by the use of the waste heat of a nuclear reactor for such purposes. Another high temperature pump 54 delivers liquid lithium hydride from the lithium hydride liquefier 53 to the hydrogen disassociator 52 and a centrifugal separation pump 55 draws liquid lithium hydride and lithium from the hydrogen disassociator 52 returning the lithium hydride to the hydrogen disassociator while delivering the lithium to lithium storage tanks 56. Hydrogen in a gaseous state flows from the hydrogen disassociator 52 through a space radiator 57 to any suitable hydrogen liquefication plant comprising a hydrogen liquefier 58 and liquid hydrogen storage tanks 59.

Figure 5:
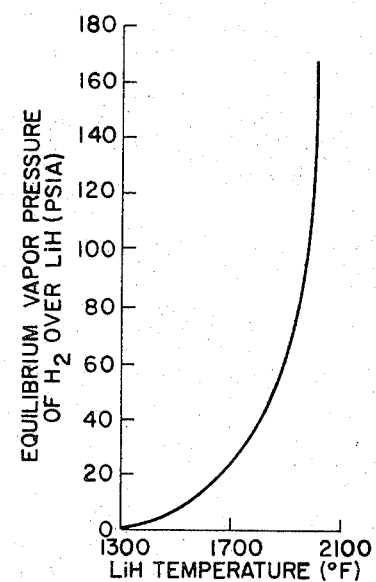
FIGURE 5 is a graphical presentation of the relationships between temperature and equilibrium vapor pressure of hydrogen over lithium hydride.

In operation, lithium hydride from the storage tank 29 of FIGURE 1 is placed into the lithium hydride liquefier 53. The fluid circulated by the pump 50 transfers heat from the heat source 51 to the lithium hydride in the liquefier 53 to effect liquefication thereof. The pump 54 functions as necessary to maintain a predetermined level of liquid lithium hydride from the liquefier 53 in the hydrogen disassociator 52. The temperature of the lithium hydride in the hydrogen disassociator 52 is further raised by an additional transfer of heat from the fluid being circulated therethrough by the pump 50 such that a portion of the lithium hydride in the disassociator breaks down into gaseous hydrogen and liquid lithium. This condition may be appreciated by referring to FIGURE 5 which presents the effect of higher temperatures on hydrogen pressure in the hydrogen disassociator 52.

As previously noted, the lithium is separated from the lithium hydride and delivered to the storage tanks 56 by the centrifugal separation pump 55. Gaseous hydrogen is drawn off from the hydrogen disassociator 52 by the hydrogen liquefier 58, which comprises suitable compressors and radiators, and, after being liquefied, is delivered to the storage tanks 59. In passing from the hydrogen disassociator 52 to the hydrogen liquefier 58 the hydrogen flows through the space radiator 57 where a large amount of the heat contained by the hydrogen is dissipated to the lunar environment. It will be recognized that very efficient operation is obtained by utilizing this fuel regeneration system during the lunar night.

Figure 3:
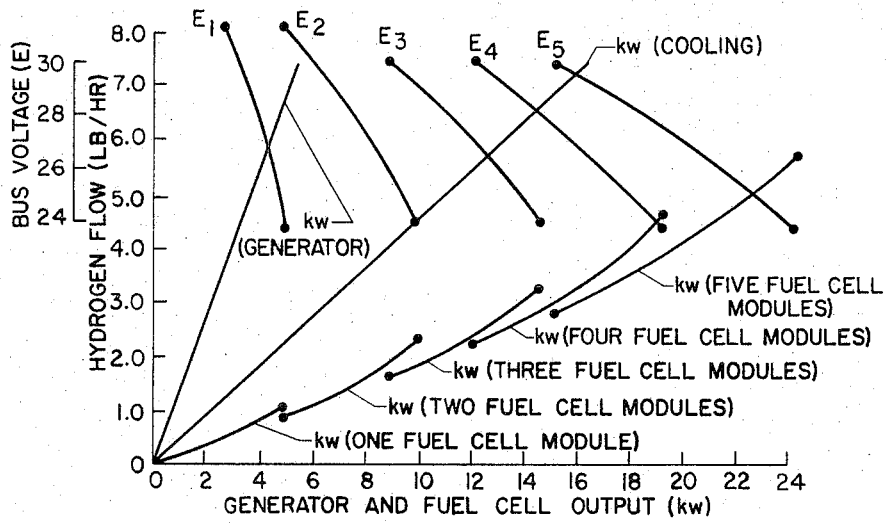
FIGURE 3 is a graphical presentation of the typical relationships between generator and fuel cell power output and hydrogen flow rate and bus voltage in the system illustrated in FIGURE 1.

Typical system operating temperatures have been reflected on FIGURE 4 in order to impart a better understanding of the present invention. These, like the operating conditions reflected on FIGURES 1, 2, and 3 are exemplary only and are not intended to limit the scope of the present invention in any manner.

Lithium from the storage tanks 56 and hydrogen from the storage tanks 59 (see FIGURE 4) may be used as necessary to replace lithium and hydrogen in the storage tanks 17 and 18 (see FIGURE 1), respectively.

From the foregoing description it is readily apparent that this invention provides a highly efficient integrated environmental control and power supply system for lunar applications. The fact that the fuels employed are completely regenerative on the lunar surface makes this system uniquely well suited for such purposes.

Figure 6:
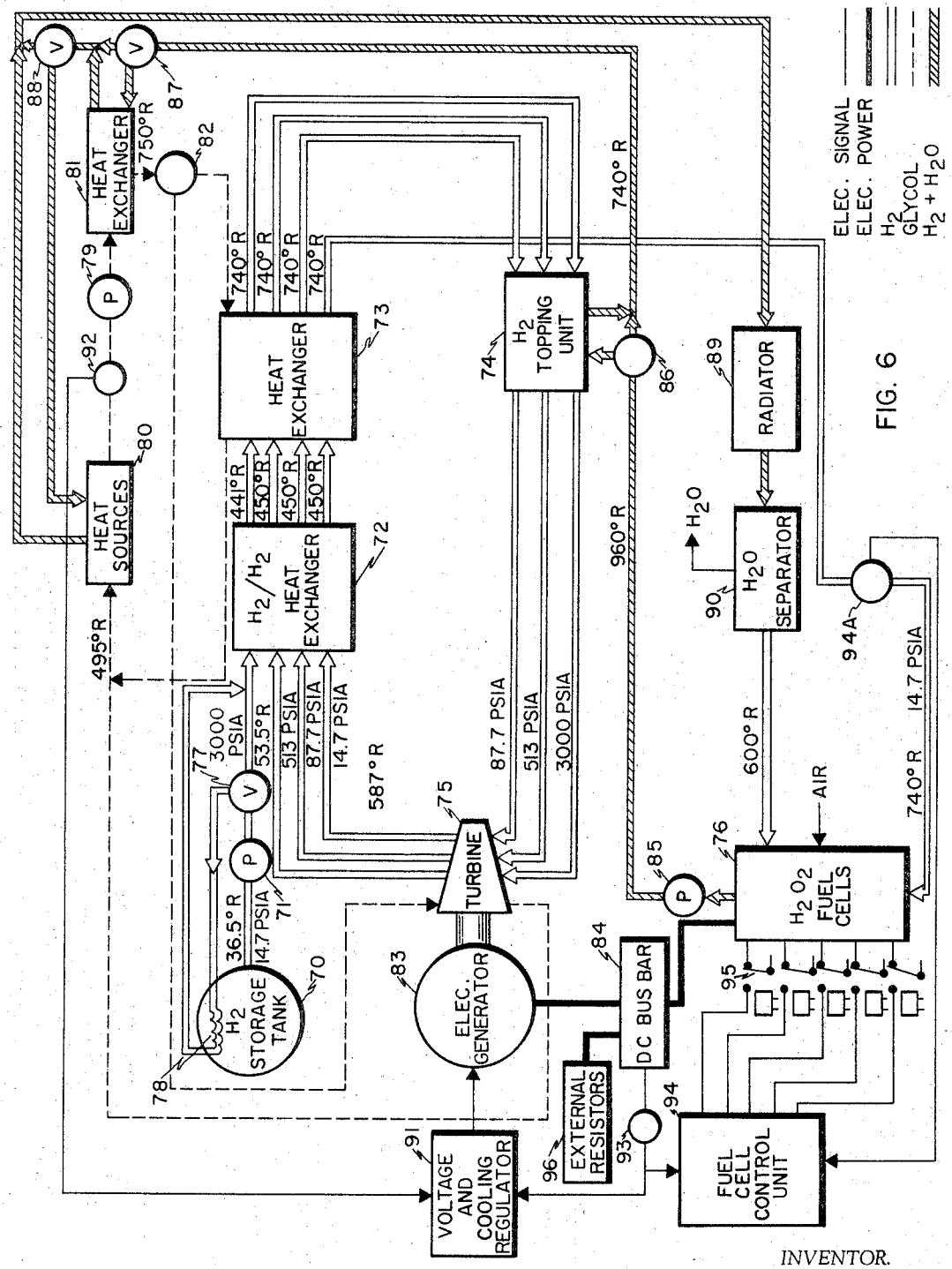
FIGURE 6 is a schematic diagram of a preferred embodiment of this invention for terrestrial applications.

An embodiment of this invention particularly well adapted for terrestrial applications is diagrammatically illustrated in FIGURE 6. This system is very similar to that illustrated in FIGURE 1 in that low temperature liquid hydrogen is initially located in a storage tank 70 from which it is delivered by a cryogenic pump 71 to a hydrogen-to-hydrogen heat exchanger 72, a heat exchanger 73, a hydrogen topping unit 74 and a turbine 75. After making a plurality of passes through these units, the hydrogen is finally exhausted to a plurality of hydrogen-oxygen fuel cells 76 wherein it reacts with air from the surrounding environment to produce an electrical energy output. A proportional control valve 77 operates in response to the pressure within the storage tank 70 to divert a portion of the hydrogen from the pump 71 through a heating coil 78 located in the storage tank 70 to continually maintain the hydrogen therein at approximately atmospheric pressure. A suitable coolant, such as glycol, is circulated by a pump 79 through various heat sources 80 in order to remove heat therefrom. After passing through a heat exchanger 81, the function of which will subsequently become apparent, the coolant is proportioned by a proportional control valve 82 between the heat exchanger 73 and the turbine 75. The operation of this valve 82 is controlled by a hydrogen flowmeter (not shown) to direct the proper amount of coolant flowing therethrough to the turbine 75 such that a sufficient amount of heat is transferred therefrom to the hydrogen as it expands to drive the turbine to effect substantially a polytropic expansion of the hydrogen within the turbine. From the heat exchanger 73 and the turbine 75 the coolant is returned to the heat sources 80. The turbine 75 drives an electrical generator 83 to produce an electrical energy output which is coupled to the electrical energy output of the fuel cells 76 on a DC bus bar 84.

The chemical reaction within the fuel cells 76 produces water vapor which, along with unreacted hydrogen, is removed therefrom by a centrifugal pump 85. A proportional control valve 86 operates in response to the system's power output to direct hydrogen and water vapor from the fuel cells 76 through the hydrogen topping unit 74 for purposes to be subsequently explained. As will also be later explained in more detail, a proportional control valve 87 operates in response to the temperature of the coolant leaving the heat sources 80 to direct hydrogen and water vapor from the fuel cells 76 through the heat exchanger 81. After flowing through the valve 87 and at certain times the heat exchanger 81, the coolant from the fuel cells 76 enters another proportional control valve 88 which, as will be subsequently discussed, at certain times causes a portion thereof to flow through the heat sources 80. The hydrogen and water vapor from the fuel cells 76 are then further cooled in a radiator 89, which in effect dissipates to the surrounding environment the heat of the chemical reaction within the fuel cells that has not been transferred to the hydrogen as it flows through the topping unit 74, to the coolant from the heat sources 80 as it flows through the heat exchanger 81 or to the heat sources 80, and wherein the water vapor from the fuel cells 76 is condensed. The condensed water is separated from the hydrogen by a water separator 90 which exhausts the water to the surrounding environment, and the hydrogen is then returned to the fuel cells 76 for further processing.

A voltage and cooling regulator 91, which is responsive to the temperature of the coolant as it leaves the heat sources 80 as indicated by the temperature sensing device 92 and the system's electrical power output as indicated by a power sensing element 93, is connected to the electrical generator 83. A fuel cell control unit 94 operates in response to a voltage input from the DC bus bar 84 and the pressure of the hydrogen entering the fuel cells as indicated by a pressure sensitive element 94A in a manner identical to the fuel cell control unit 43 of the system illustrated in FIGURE 1 to energize the proper number of fuel cells 76 through a plurality of relays 95 that will provide the best voltage regulation on the DC bus bar 84. Associated with the DC bus bar 84 is a group of external resistors 96 which serve a purpose to be subsequently more fully described.

In order to impart a better understanding of the present invention, certain operating temperatures and pressures have been reflected on the schematic diagram of FIGURE 6. Again, these are not to be interpreted as limiting the scope of the present invention in any manner.

In operation, this system is similar to that shown in FIGURE 1 in that the hydrogen from the storage tank 70 acts as a low temperature heat sink in the heat exchanger 73 for the coolant from the heat sources 80, as the working fluid for the hydrogen expansion turbine 75 and as a fuel for the hydrogen-oxygen fuel cells 76. However, in this application the hydrogen additionally functions as a coolant for the fuel cells 76. Hydrogen from the storage tank 70 is pre-heated as it passes through the hydrogen-to-hydrogen heat exchanger 72 in order to prevent the coolant from the heat sources 80 freezing within the heat exchanger 73. System operating efficiency is optimized by the hydrogen's making several passes between the heat exchanger 73 and the turbine 75 before being exhausted to the fuel cell 76 and, further, by the fact that waste heat from the heat sources 80 is untilized to effect a substantially polytropic expansion of the hydrogen within the turbine 75.

In this system hydrogen from the storage tank 70 and air from the surrounding environment are continually made available to all fuel cells 76.

When there is a cooling load on the system and the electrical load thereon is at an absolute minimum or non-existent, the voltage and cooling regulator 91 is responsive to the temperature of the coolant leaving the heat sources 80 to control the load on the electrical generator 83 such that the amount of hydrogen necessary to handle the cooling load flows through the heat exchange 73. At such time, since the hydrogen flow necessary to satisfy the cooling requirement produces an electrical power output on the DC bus bar 84 greater than the power load on the system, external resistors 96 are coupled to the DC bus bar as necessary to effect a balance therebetween. Under such conditions no hydrogen and water vapor from the fuel cells 76 is directed through the hydrogen topping unit 74 by the valve 86, through the heat exchanger 81 by the valve 87 or through the heat sources 80 by the valve 88. It will be apparent that this situation will seldom exist in terrestrial applications since the hydrogen flow necessary to handle the power will normally exceed that required to handle the cooling load. However, one example of such a situation would be the air conditioning of a stationary vehicle.

As the power load increases with respect to the cooling load, the voltage and cooling regulator 91 acts to uncouple external resistors 96 from the DC bus bar 84 as required. If this operation does not satisfy the increased power load, the valve 86 directs hydrogen and water vapor from the fuel cells 76 through the hydrogen topping unit 74 to increase the power output of the electrical generator 83. Should the power load still exceed the system's power output when all of the hydrogen and water vapor from the fuel cells 76 is flowing through the hydrogen topping unit 74, the voltage and cooling regulator 91 effects an increased hydrogen flow through the system by increasing the load on the electrical generator 83. This increased hydrogen flow tends to create an over-cooling situation in the heat exchanger 73 which is reflected in a decrease in the temperature of the coolant from the heat sources 80. The valve 87 is responsive to this coolant temperature decrease to proportion an amount of hydrogen and water vapor from the fuel cell 76 through the heat exchanger 81 such that the proper amount of heat is added to the cooling flowing therethrough to accommodate an otherwise overcooling condition.

Since one of the heat sources 11 will comprise the environment in which the system is operating, it will be recognized that under certain conditions it will be necessary to heat the operator and passenger section of the vehicle. When the waste heat from the other heat source 11 is insufficient to raise the temperature of this section to the necessary level, the proportional control valve 88 is energized by the temperature within this section of the vehicle to direct a sufficient quantity of the coolant from the fuel cells 76 through the heat sources 11 as will maintain the proper temperature within this section.

It will be apparent that, while the lithium-hydrogen system illustrated in FIGURE 1 is ideally suited for use on the lunar surface, circumstances may very well develop which would require lunar use of a system utilizing hydrogen-oxygen fuel cells. Under such conditions satisfactory operation may be obtained utilizing a liquid oxygen fuel source. In addition, terrestrial applications of the present invention may employ types of fuel cells other than the hydrogen-oxygen fuel cells illustrated in FIGURE 6. For instance, the fuel initially stored in the storage tank 70 may be either liquid propane or liquid butane, in which cases the system would employ propane-oxygen or butane-oxygen fuel cells, respectively.

This invention may be practiced or embodied in other ways without departing from the spirit or essential character thereof. The embodiments and process of the invention described herein are therefore illustrative and not restrictive, the scope of the invention being indicated by the appended claims and all changes which come within the meaning and range of equivalency of the claims are intended to be embraced therein.

The invention claimed is:

1. A system for simultaneously producing environmental control for various heat sources and an electric power output comprising:
   (a) a tank of low temperature, low pressure liquid hydrogen;
   (b) a heat exchanger;
   (c) a pump connected between said tank and said heat exchanger whereby said hydrogen may be introduced into said heat exchanger in a low temperature, high pressure condition to produce a low temperature heat sink within said heat exchanger, said hydrogen leaving said heat exchanger in a high temperature; high pressure gaseous condition;
   (d) a hydrogen expansion turbine driven by said hydrogen from said heat exchanger;
   (e) at least one lithium-hydrogen fuel cell connected to said turbine to receive said hydrogen exhausted therefrom;
   (f) first means for introducing lithium into said fuel cell simultaneously as said hydrogn is exhausted thereinto to produce an electrical power output from the chemical reaction within said fuel cell, said chemical reaction resulting in the formation of lithium hydride;

(g) a second means for causing said hydrogen to make a plurality of passes between said heat exchanger and said turbine before being exhausted to said fuel cell whereby said hydrogen is expanded in a plurality of stages within said turbine to drive said turbine;

(h) an electrical generator coupled to said turbine to convert at least a portion of the mechanical power produced by said turbine into an electrical power output;

(i) a hydrogen-to-hydrogen heat exchanger wherein said hydrogen from said pump is pre-heated prior to its initial introduction into said heat exchanger by said passes of said hydrogen from said turbine to said heat exchanger;

(j) a third means for heating said hydrogen as it expands in driving said turbine to thereby effect a substantially polytropic expansion of said hydrogen within said turbine;

(k) a fourth means for transferring at least a portion of the heat produced by said chemical reaction within said fuel cell to said hydrogen and said lithium substantially immediately prior to their being introduced into said fuel cell;

(l) a hydrogen topping unit connected between said heat exchanger and said turbine whereby a portion of said heat produced by said chemical reaction within said fuel cell may be transferred to said hydrogen as it flows from said heat exchanger to said turbine to increase the power output of said system at such times as the hydrogen flow therethrough is sufficient to handle the cooling load thereon but the power output thereof is otherwise insufficient to satisfy the power load thereon;

(m) a fifth means for transferring at least a portion or said heat produced by said chemical reaction within said fuel cell to said hygdrogen as said hydrogen passes through said heat exchanger at such times as the flow of said hydrogen through said system necessary to satisfy the power requirements thereof would otherwise create an an overcooling condition within said heat exchanger;

(n) a sixth means for transferring at least a portion of said heat produced by said chemical reaction within said fuel cell to at least one of said heat sources at such times as the waste heat from the other said heat sources is insufficient to raise the temperature thereof to the desired level;

(o) a seventh means for transferring to the surrounding environment of said system said heat produced by said chemical reaction within said fuel cell which is in excess of that transferred to said hydrogen and said lithium by said fourth means, that transferred to said hydrogen by said hydrogen topping unit, that transferred to said hydrogen by said fifth means and that transferred to said heat sources by said sixth means;

(p) a bus bar wherein said electrical power output of said generator is coupled to said electrical power output of said fuel cell; and (q) a group of external resistors associated with said bus bar whereby said resistors may be coupled to said bus bar as necessary to effect a balance between the electrical power load on said system and said electrical power output of said system at such times as the hydrogen flow through said system necessary to handle the cooling load thereon would otherwise produce an electrical power output greater than the electrical power load thereon.

2. A system for simultaneously producing environmental control for various heat sources and an electrical power output comprising;

(a) a tank of low temperature, low pressure liquid hydrogen;

(b) a heat exchanger;

(c) a pump connected between said tank and said heat exchanger whereby said hydrogen may be introduced into said heat exchanger in a low temperature, high pressure condition to produce a low temperature heat sink within said heat exchanger, said hydrogen leaving said heat exchanger in a high temperature, high pressure gaseous condition;

(d) a hydrogen expansion turbine driven by said hydrogen from said heat exchanger;

(e) at least one hydrogen-oxygen fuel cell connected to said turbine to receive said hydrogen exhausted therefrom;

(f) first means for introducing oxygen into said fuel cell simultaneously as said hydrogen is exhausted thereinto to produce an electrical power output from the chemical reaction within said fuel cell, said chemical reaction resulting in the formation of water;

(g) a second means for causing said hydrogen to make a plurality of passes between said heat exchanger and said turbine before being exhausted to said fuel cell whereby said hydrogen is expanded in a plurality of stages within said turbine to drive said turbine;

(h) an electrical generator coupled to said turbine to convert at least a portion of the mechanical power produced by said turbine into an electrical power output;

(i) a hydrogen-to-hydrogen heat exchanger wherein said hydrogen from said pump is pre-heated prior to its initial introduction into said heat exchanger by said passes of said hydrogen from said turbine to said heat exchanger;

(j) a third means for heating said hydrogen as it expands in driving said turbine to thereby effect a substantially polytropic expansion of said hydrogen within said turbine;

(k) a hydrogen topping unit connected between said heat exchanger and said turbine whereby a portion of said heat produced by said chemical reaction within said fuel cell may be transferred to said hydrogen as it flows from said heat exchanger to said turbine to increase the power output of said system at such times as the hydrogen flow therethrough is sufficient to handle the cooling load thereon but the power output thereof is otherwise insufficient to satisfy the power load thereon;

(l) a fourth means for transferring at least a portion of said heat produced by said chemical reaction within said fuel cell to said hydrogen as said hydrogen passes through said heat exchanger at such times as the flow of said hydrogen through said system necessary to satisfy the power requirements thereof would otherwise create an over-cooling condition within said heat exchanger;

(m) a fifth means for transferring at least a portion of said heat produced by said chemical reaction within said fuel cell to at least one of said heat sources at such times as the waste heat from the other said heat sources is insufficient to raise the temperature thereof to the desired level;

(n) a sixth means for transferring to the surrounding environment of said system said heat produced by said chemical reaction within said fuel cell which is in excess of that transferred to said hydrogen by said topping unit, that transferred to said hydrogen by said fourth means and that transferred to said heat sources by said fifth means;

(o) a bus bar whereon said electrical power output of said generator is coupled to said electrical power output of said fuel cell; and (p) a group of external resistors associated with said bus bar whereby said resistors may be coupled to said bus bar as necessary to effect a balance between the elecrical power load on said system and said electrical power output of said system at such times as the hydrogen flow through said system necessary to handle the cooling load thereon would otherwise produce an electrical power output greater than the electrical power load thereon.

3. A system for simultaneously producing environmental control and an electrical power output comprising:
(a) a tank of low temperature, low pressure liquid fuel;
(b) a heat exchanger;
(c) a pump connected between said tank and said heat exchanger whereby said liquid fuel may be introduced into said heat exchanger in a low temperature, high pressure condition to produce a low temperature heat sink within said heat exchanger, said fuel leaving said heat exchanger in a high temperature, high pressure gaseous condition;
(d) a gaseous fuel expansion means driven by said gaseous fuel from said heat exchanger;
(e) at least one fuel cell connected to said expansion means to receive said gaseous fuel exhausted therefrom, said fuel cell being capable of generating an electrical power output from a chemical reaction produced therein whenever said fuel and a second ingredient are introduced thereinto;
(f) first means for introducing said second ingredient into said fuel cell simultaneously as said gaseous fuel is exhausted thereinto from said expansion means;
(g) second means for causing said gaseous fuel to make a plurality of passes between said heat exchanger and said expansion means before being introduced into said fuel cell whereby said gaseous fuel is expanded in a plurality of stages within said expansion means;
(h) an electrical generator coupled to said expansion means to convert at least a portion of the mechanical power produced by said expansion means into an electrical power output;
(i) a topping unit connected between said heat exchanger and said expansion means whereby a portion of the heat produced by said chemical reaction within said fuel cell may be transferred to said gaseous fuel as it flows from said heat exchanger to said expansion means to increase the power output of said system at such times as the gaseous fuel flow therethrough is sufficient to handle the cooling load thereon but the power output thereof is otherwise insufficient to satisfy the power load thereon;
(j) third means for transferring at least a portion of said heat produced by said chemical reaction within said fuel cell to said gaseous fuel as said gaseous fuel passes through said heat exchanger at such times as the flow of said gaseous fuel through said system necessary to satisfy the power requirements thereof would otherwise create an overcooling condition within said heat exchanger;
(k) first electrical means coupling said electrical power output of said generator to said electrical power output of said fuel cell; and
(l) second electrical means coupled to said first electrical means to match the load on the first electrical means to the power output of said system at such times as the gaseous fuel flow through the system necessary to handle the cooling load thereon results in a greater system power output than required to handle the power load on said system.

4. The system of claim 3 wherein said gaseous fuel expansion means includes a turbine.

5. The system of claim 3 wherein said second electrical means includes a group of resistors.

References Cited

UNITED STATES PATENTS

| | | | |
|---|---|---|---|
| 3,133,837 | 5/1964 | Eidensohn | 136—86 |
| 3,141,796 | 7/1964 | Fay et al. | 136—86 |
| 3,155,547 | 11/1964 | Siebker | 136—86 |
| 3,172,784 | 3/1965 | Blackmer | 136—86 |
| 3,198,664 | 8/1965 | Kunz | 136—86 |
| 3,202,546 | 8/1965 | Rightmire et al. | 136—86 |
| 3,208,216 | 9/1965 | Silvern et al. | 60—39.46 X |
| 3,208,883 | 9/1965 | Crouthamel et al. | 136—86 |
| 3,222,223 | 12/1965 | Platner | 136—86 |
| 3,232,050 | 2/1966 | Robinson et al. | 60—36 |

FOREIGN PATENTS 1,149,229  7/1957  France.

OTHER REFERENCES

Hoffman Electronics Corp., Survey of the State-of-the-Art Fuel Cell Development, Armed Services Technical Information Agency, AD 248,428 (p. 31 relied upon).

ALLEN B. CURTIS, *Primary Examiner.*

WINSTON A. DOUGLAS, *Examiner.*